US008097682B2

(12) United States Patent
Pellegatti et al.

(10) Patent No.: US 8,097,682 B2
(45) Date of Patent: *Jan. 17, 2012

(54) 1-BUTENE PROPYLENE COPOLYMER COMPOSITIONS

(75) Inventors: Giampaolo Pellegatti, Ferrara (IT); Daniele Bigiavi, Bologna (IT); Rita Martelli, Ferrara (IT); Maria Silvia Tonti, Ferrara (IT); Luigi Resconi, Ferrara (IT); Simona Guidotti, Bologna (IT)

(73) Assignee: Basell Polyolefine GmbH, Wesseling (DE)

( * ) Notice: Subject to any disclaimer, the term of this patent is extended or adjusted under 35 U.S.C. 154(b) by 87 days.

This patent is subject to a terminal disclaimer.

(21) Appl. No.: 12/310,507

(22) PCT Filed: Aug. 23, 2007

(86) PCT No.: PCT/EP2007/058781
§ 371 (c)(1),
(2), (4) Date: Jan. 11, 2010

(87) PCT Pub. No.: WO2008/025721
PCT Pub. Date: Mar. 6, 2008

(65) Prior Publication Data
US 2010/0121015 A1 May 13, 2010

Related U.S. Application Data

(60) Provisional application No. 60/841,702, filed on Sep. 1, 2006.

(30) Foreign Application Priority Data

Aug. 30, 2006 (EP) ..................................... 06119816

(51) Int. Cl.
C08L 23/20 (2006.01)
C08F 210/08 (2006.01)
C08F 4/60 (2006.01)
C08F 4/6592 (2006.01)
B01J 31/22 (2006.01)

(52) U.S. Cl. ........ 525/245; 526/113; 526/114; 526/160; 526/161; 526/165; 526/348.6; 526/943; 502/113; 502/152; 502/155; 525/242

(58) Field of Classification Search .................. 526/113, 526/114, 160, 161, 165, 943, 348.6; 502/113, 502/152, 155
See application file for complete search history.

(56) References Cited

U.S. PATENT DOCUMENTS

| | | | |
|---|---|---|---|
| 4,298,722 A | 11/1981 | Collette et al. | |
| 6,288,192 B1 | 9/2001 | Fujita et al. | |
| 6,444,833 B1 | 9/2002 | Ewen et al. | |
| 6,559,252 B1 | 5/2003 | Horton et al. | |
| 6,608,224 B2 | 8/2003 | Resconi et al. | |
| 6,635,779 B1 | 10/2003 | Ewen et al. | |
| 6,841,501 B2 | 1/2005 | Resconi et al. | |
| 6,878,786 B2 | 4/2005 | Resconi et al. | |
| 6,930,190 B2 | 8/2005 | Nifant'ev et al. | |
| 6,953,829 B2 | 10/2005 | Kratzer et al. | |
| 7,074,864 B2 | 7/2006 | Resconi | |
| 7,101,940 B2 | 9/2006 | Schottek et al. | |
| 7,141,527 B1 | 11/2006 | Van Baar et al. | |
| 7,141,637 B2 | 11/2006 | Elder et al. | |
| 7,163,907 B1 | 1/2007 | Canich et al. | |
| 7,390,862 B2 | 6/2008 | Resconi | |
| 7,459,511 B2 | 12/2008 | Resconi | |
| 7,476,717 B2 | 1/2009 | Resconi | |
| 7,531,609 B2 * | 5/2009 | Resconi et al. ............... | 526/161 |
| 7,579,423 B2 | 8/2009 | Resconi | |
| 2006/0252637 A1 | 11/2006 | Okumura | |
| 2008/0027190 A1 | 1/2008 | Tonti et al. | |
| 2008/0139761 A1 | 6/2008 | Resconi | |
| 2008/0171840 A1 | 7/2008 | Resconi | |
| 2008/0275254 A1 | 11/2008 | Resconi | |
| 2009/0005523 A1 | 1/2009 | Resconi et al. | |

FOREIGN PATENT DOCUMENTS

| | | |
|---|---|---|
| DE | 19962814 | 6/2001 |
| DE | 19962910 | 7/2001 |
| EP | 604908 | 7/1994 |
| EP | 1219645 | 7/2002 |
| EP | 1308466 | 5/2003 |
| WO | 91/02012 | 2/1991 |

(Continued)

OTHER PUBLICATIONS

V. Holland et al., "Isotactic Polybutene-1 Single Crystals: Morphology," *Journal of Applied Physics*, vol. 35(11), p. 3241-3248 (1964).
B. Lotz et al., "Chirality Constraints in Crystal-Crystal Transformations: Isotactic Poly(1-butene) versus Syndiotactic Polypropylene," *Macromolecules*, vol. 31(26), p. 9253-9257 (1998).
L. Resconi et al., "1-Olefin Polymerization at Bis(pentamethylcyclopentadienyl)zirconium and -hafnium Centers: Enantioface Selectivity," *Macromolecules*, vol. 25(25), p. 6814-6817 (1992).

(Continued)

*Primary Examiner* — Caixia Lu
(74) *Attorney, Agent, or Firm* — Dilworth IP, LLC

(57) ABSTRACT

A 1-butene/propylene copolymer composition having a content of propylene derived units from 4 to 10% by weight, wherein at least 50% of the polymer is present in the thermodynamically stable, trigonal form I after 100 hours at room temperature, said composition comprising:
a) from 5% by weight to 95% by weight of an atactic 1-butene propylene copolymer having the following features:
 i) distribution of molecular weight Mw/Mn equal to or lower than 4;
 ii) no enthalpy of fusion detectable at a differential scanning calorimeter (DSC); and
 iii) infrared crystallinity lower than 0.5%;
b) from 5% by weight to 95% by weight of an isotactic 1-butene propylene copolymer having the following features:
 i) isotactic pentads (mmmm) measured by $^{13}$C-NMR, higher than 80%;
 ii) melting point (Tm(II)) higher than 70° C.; and
 iii) distribution of molecular weight Mw/Mn equal to or lower than 4.

10 Claims, 1 Drawing Sheet

FOREIGN PATENT DOCUMENTS

Figure 1:
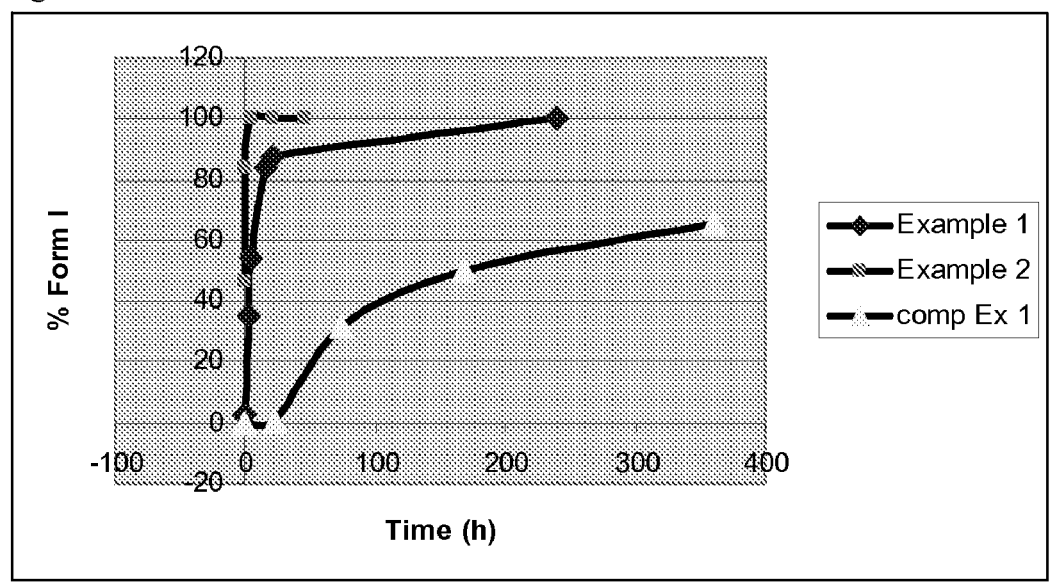

| | | |
|---|---|---|
| WO | 92/00333 | 1/1992 |
| WO | 92/21899 | 5/1999 |
| WO | 01/21674 | 3/2001 |
| WO | 01/44318 | 6/2001 |
| WO | 01/62764 | 8/2001 |
| WO | 02/100908 | 12/2002 |
| WO | 02/100909 | 12/2002 |
| WO | 03/014107 | 2/2003 |
| WO | 03/045964 | 6/2003 |
| WO | 2004/099269 | 11/2004 |
| WO | 2004/106351 | 12/2004 |
| WO | 2005/105865 | 11/2005 |
| WO | 2006/008211 | 1/2006 |
| WO | 2008/025710 | 3/2008 |

OTHER PUBLICATIONS

H. Cheng, "$^{13}$NMR Analysis of Propylene-Butylene Copolymers by a Reaction Probability Model," *Journal of Polymer Science: Polymer Physics Edition,* vol. 21, p. 573-581 (1983).

A. Nishioka et al., "Crystallinity and Stereoregularity of Polybutene-1," *Chem. of High Polymers* (Japan), vol. 19, p. 667-671 (1962).

\* cited by examiner

1-BUTENE PROPYLENE COPOLYMER COMPOSITIONS

This application is the U.S. national phase of International Application PCT/EP2007/058781, filed Aug. 23, 2007, claiming priority to European Application 06119816.4 filed Aug. 30, 2006 and the benefit under 35 U.S.C. 119(e) of U.S. Provisional Application No. 60/841,702, filed Sep. 1, 2006; the disclosures of International Application PCT/EP2007/058781, European Application 06119816.4 and U.S. Provisional Application No. 60/841,702, each as filed, are incorporated herein by reference.

The present invention relates to a 1-butene/propylene-based copolymer composition obtained by using a metallocene-base catalyst system.

1-Butene polymers are well known in the art. In view of their good properties in terms of pressure resistance, creep resistance, and impact strength, they are widely used for example in the manufacture of pipes for metal pipe replacement, easy-open packaging and films.

Isotactic 1-butene based polymers produced by using metallocene-based catalyst system are well known in the art, processes for obtaining them are described for example in WO 02/100908, WO 02/100909 and WO 03/014107, however the polymers obtainable are endowed with a very high isotacticity.

From the other side atactic 1-butene polymers are known in the art, it is a sticky polymer mainly used as components for adhesive compositions. Examples of processes for producing this polymers are given in U.S. Pat. No. 6,288,192; EP 604 908 and EP 04101912.6.

For certain applications there is the need for a material softer than the isotactic 1-butene polymer, having elastomeric properties, but this material has to be easily processable and above all not sticky as the atactic 1-butene polymers are.

A fractionable elastomeric 1-butene polymers is described in U.S. Pat. No. 4,298,722. This polymer is obtained by using organozirconium compounds such as tetraneophylzirconium, i.e. compounds in which the metal do not have n-bond as metallocene compounds have. The obtained 1-butene polymer can be fractionated with diethyl ether and the ether soluble fractions among other features has an infrared crystallinity value comprised between 1% to 15%. This value is quite high if compared with the infrared crystallinity soluble fraction of the 1-butene polymers of the present invention.

When 1-butene-based polymer are produced they usually crystallize from its solution in the tetragonal form II which then spontaneously transforms into the thermodynamically stable, trigonal form I, as reported in J. Appl. Phys. 1964, 35, 3241 and Macromolecules 1998, 31, 9253. Complete transformation at room temperature requires several days, and usually does not proceed to completion. The most important difference between the two forms is in the melting point that in Form I is higher than Form II. These two forms can be evidenced by a DSC thermogram. In fact, in the thermogram two main peaks can be evidenced representing the melting enthalpy of the form I (the form melting at higher temperature) and form II (the form melting at lower temperature). By aging the sample it can be noted that the peak representing the form II decreases and the peak representing form I appears or increases, while the total enthalpy represented by the sum of the areas of the two peaks remains substantially constant. It has to be noted that the peak representing form I is not always present at low aging of the sample, but after a certain amount of time it appears in the thermogram. Otherwise the two peaks can be present also at time 0 of the thermogram. Thus it would be desirable to have a material that is converted in form I in the shorter time possible, so that to avoid long storage time before to have the material having the final properties.

An object of the present invention is therefore a 1-butene/propylene copolymer composition having a content of propylene derived units from 4 to 10% by weight, wherein at least 50% of the crystalline polymer is present in the thermodynamically stable, trigonal Form I (detected by DSC analysis) after 100 hours of the first melting at room temperature comprising:
  i) isotactic pentads (mmmm) measured by $^{13}$C-NMR, comprised between 30% and 80%; preferably comprised between 45% and 75%; more preferably between 50% and 60%;
  ii) melting point (Tm(II)) higher than 70° C.;
  iii) distribution of molecular weight Mw/Mn equal to or lower than 4.0; and
  iv) solubility in xylene at 0° C. (according to the procedure described below) higher than 75.0%; preferably higher than 90.0%; more preferably higher than 95.0%; even more preferably higher than 99.0%;
said composition being obtainable by polymerizing 1-butene and propylene, in the presence of a catalyst system obtainable by contacting:
a) at least a metallocene compound of formula (Ia) in the meso or meso-like form

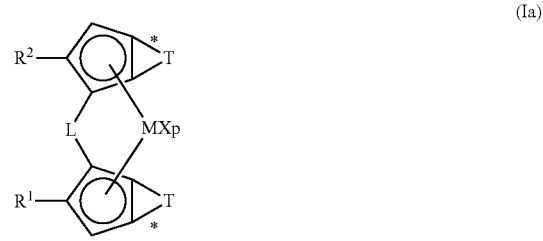

(Ia)

wherein
M is an atom of a transition metal selected from those belonging to group 3, 4, 5, 6 or to the lanthanide or actinide groups in the Periodic Table of the Elements; preferably M is titanium, zirconium or hafnium;
p is an integer from 0 to 3, preferably p is 2, being equal to the formal oxidation state of the metal M minus 2;
X, same or different, is a hydrogen atom, a halogen atom, or a R, OR, $OSO_2CF_3$, OCOR, SR, $NR_2$ or $PR_2$ group, wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or ethyl radicals;
L is a divalent $C_1$-$C_{40}$ hydrocarbon radical optionally containing heteroatoms belonging to groups 13-17 of the Periodic Table of the Elements or a divalent silylidene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylidene radical containing up to 5 silicon atoms such as $SiMe_2$, $SiPh_2$; preferably L is a group $(Z(R'')_2)_n$ wherein Z is a carbon or a silicon atom, n is 1 or 2 and R'' is a $C_1$-$C_{20}$ hydrocarbon radical optionally containing heteroatoms belonging to groups 13-17 of the Periodic Table of the Elements; preferably R'' is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, $SiPhMe$, $SiMe(SiMe_3)$, $CH_2$, $(CH_2)_2$, and $C(CH_3)_2$;

$R^1$ and $R^2$, equal to or different from each other, are $C_1$-$C_{40}$ hydrocarbon radicals optionally containing heteroatoms belonging to groups 13-17 of the Periodic Table of the Elements; preferably they are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^1$ and $R^2$ are linear or branched, saturated or unsaturated $C_1$-$C_{20}$-alkyl radicals; more preferably $R^1$ and $R^2$ are methyl or ethyl radicals;

T, equal to or different from each other, is a moiety of formula (IIa), (IIb) or (IIc):

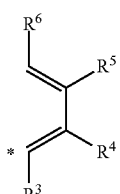
(IIa)

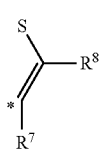
(IIb)

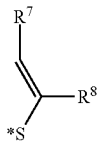
(IIc)

wherein the atom marked with the symbol * bonds the atom marked with the same symbol in the compound of formula (Ia); and wherein at least one T group has formula (IIb) or (IIc);

$R^3$ is a $C_1$-$C_{40}$ hydrocarbon radical optionally containing heteroatoms belonging to groups 13-17 of the Periodic Table of the Elements; preferably $R^3$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-arylalkyl or a $C_7$-$C_{40}$-alkylaryl radical; optionally containing heteroatoms belonging to groups 13-17 of the Periodic Table of the Elements; more preferably $R^3$ is a linear or branched, $C_1$-$C_{20}$-alkyl $C_6$-$C_{40}$-aryl, $C_7$-$C_{40}$-arylalkyl radical; even more preferably $R^3$ is a $C_6$-$C_{20}$-aryl radical optionally substituted with one or more $C_1$-$C_{10}$ alkyl groups;

$R^4$ and $R^6$, equal to or different from each other, are hydrogen atoms or $C_1$-$C_{40}$ hydrocarbon radicals optionally containing heteroatoms belonging to groups 13-17 of the Periodic Table of the Elements; preferably $R^4$ and $R^6$, equal to or different from each other, are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably $R^4$ and $R^6$ are hydrogen atoms;

$R^5$ is a $C_1$-$C_{40}$ hydrocarbon radical optionally containing heteroatoms belonging to groups 13-17 of the Periodic Table of the Elements; preferably $R^5$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^5$ is a linear or branched, saturated or unsaturated $C_1$-$C_{20}$-alkyl radical; even more preferably $R^5$ is a methyl or ethyl radical;

$R^7$ and $R^8$, equal to or different from each other, are hydrogen atoms or $C_1$-$C_{40}$ hydrocarbon radicals optionally containing heteroatoms belonging to groups 13-17 of the Periodic Table of the Elements; preferably $R^7$ and $R^8$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

preferably $R^8$ is a hydrogen atom or a linear or branched, saturated or unsaturated $C_1$-$C_{20}$-alkyl radical; more preferably $R^8$ is a methyl or ethyl radical; preferably $R^7$ is a $C_1$-$C_{40}$-alkyl, $C_6$-$C_{40}$-aryl or a $C_7$-$C_{40}$-arylalkyl; more preferably $R^7$ is a group of formula (III)

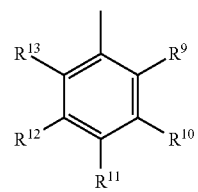
(III)

wherein $R^9$, $R^{10}$, $R^{11}$, $R^{12}$ and $R^{13}$, equal to or different from each other, are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; optionally containing heteroatoms belonging to groups 13-17 of the Periodic Table of the Elements; preferably $R^9$, and $R^{12}$ are a hydrogen atoms; $R^{10}$, $R^{11}$ and $R^{13}$ are preferably hydrogen atoms or linear or branched, cyclic or acyclic, $C_1$-$C_{10}$-alkyl radicals;

b) at least a metallocene compound of formula (Ib) in the racemic (rac) or racemic-like form

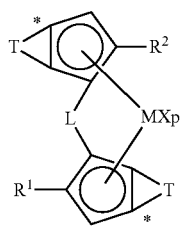

(Ib)

wherein R¹, R², T, L, M, X and p have been described above; and wherein R¹, R², T, L, M, X and p have been described above; and wherein the atoms marked with the symbol * bonds the atom marked with the same symbol in the moieties of formula (IIa), (IIb) or (IIc)

c) an alumoxane or a compound capable of forming an alkyl metallocene cation; and optionally d) an organo aluminum compound;

wherein the ratio between the racemic or the racemic like form and the meso form or the meso-like form ranges from 20:80 to 80:20; preferably from 30:70 to 70:30; more preferably from 35:65 to 65:35.

For the purpose of the present invention the term "meso form" means that the same substituents on the two cyclopentadienyl moieties are on the same side with respect to the plane containing the zirconium and the centre of the said cyclopentadienyl moieties. "Meso-like form" means that the bulkier substituents of the two cyclopentadienyl moieties on the metallocene compound are on the same side with respect to the plane containing the zirconium and the centre of the said cyclopentadienyl moieties as shown in the following compound:

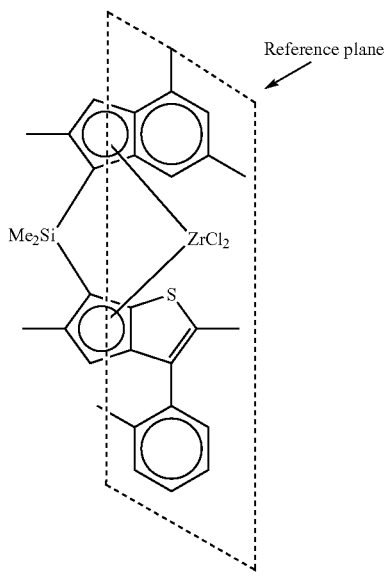

For the purpose of the present invention the term "racemic form" means that the same substituents on the two cyclopentadienyl moieties are on the opposite side with respect to the plane containing the zirconium and the centre of the said cyclopentadienyl moieties. "Racemic-like form" means that the bulkier substituents of the two cyclopentadienyl moieties on the metallocene compound are on the opposite side with respect to the plane containing the zirconium and the centre of the said cyclopentadienyl moieties as shown in the following compound:

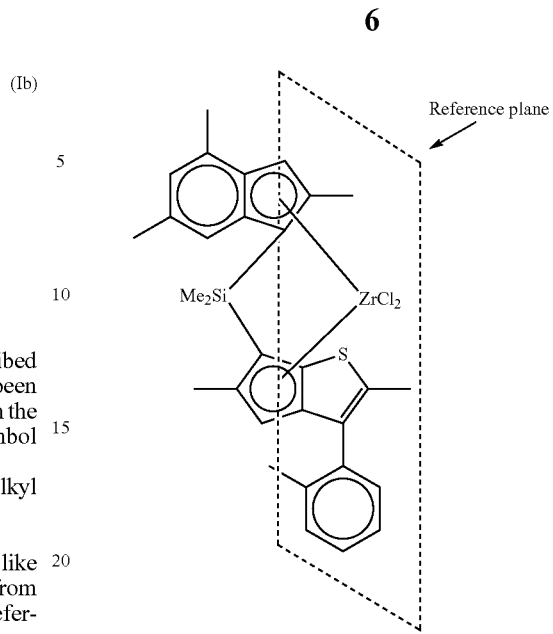

The 1-butene propylene copolymer composition of the present invention is endowed with a particular fast transition between Form II and Form I. The transition is measured by DSC analysis. A typical thermogram presents two main peaks, representing the Form I (higher melting point) and Form II (lower melting point). Sometimes at lower times only the peak of form II is present, then the peak of form I appears at higher time of aging. The areas of these peaks are directly proportional to the amount of crystalline polymer presented in Form I and Form II. Thus the ratio of the areas (that are also directly proportional to the enthalpy of fusion of each form) is directly proportional to the amount of crystalline polymer in Form I or Form II present in the polymer. Thus with the first DSC thermogram the polymer is melted and the ratio Form I Form II is measured by measuring the enthalpy of fusion. Then after 100 hours at room temperature the enthalpy of fusion is measured again, so that to measure the transformation between Form II and Form I by measuring the areas of the peaks referring to the enthalpy of fusion of these forms. As said above the polymer object of the present invention is endowed with a particular fast transformation between Form II and Form I. This fast transformation has the advantage to reduce considerably the annealing of the resin. This effect is enhanced by the particular composition of the resin (atactic and isotactic polymers). The transition can be measured by DSC as described below. Preferably in the 1-butene/propylene copolymer composition object of the present invention at least 80% of the crystalline polymer is present in the thermodynamically stable, trigonal Form I after 16 hours annealing at room temperature; even more preferably at least 99% of the crystalline polymer is present in the thermodynamically stable, trigonal Form I is present in form I after 240 hours.

The melting point of the polymer composition object of the present invention is comprised between 80° C. and 100° C. more preferably it is comprised between 85° C. and 98° C.

For the purpose of the present invention the melting point of the copolymer are always referred to form I or otherwise specified.

Preferably the intrinsic viscosity (IV) of the of the polymer composition object of the present invention, measured in tetrahydronaphtalene (THN) at 135° C. is comprised between 0.5 dl/g and 4.0 dl/g; preferably it is comprised between 1.0 dl/g and 3.0 dl/g, even more preferably the intrinsic viscosity (IV) is higher than 1.1 dl/g and lower than 2.5 dl/g.

With the 1-butene composition object of the present invention it is possible to soft the isotactic 1-butene-based polymers in a very efficient way so that to achieve a new material that can be used for several applications in order to replace, for example, polyvinylchloride, polyurethane or styrene block copolymers. In fact by the use of the catalyst system described above containing both the racemic and the meso form of the metallocene compound of formula (I) it is possible to obtain a very intimate blend of isotactic (racemic form) and atactic (meso form) 1-butene/propylene copolymer. The presence of the isotactic 1-butene copolymer has the advantage to make the resulting composition not sticky, even if it retains most of the properties of the atactic 1-butene polymers, in this way the processability of the composition is greatly improved.

Therefore the 1-butene/propylene copolymer composition according to the present invention is further endowed with a very low value of Shore A (measured according to ISO 868), ranging from 50 to 100.

In an alternative embodiment the compounds of formulas (Ia) and (Ib) have respectively the following formulas (Va) or (Vb)

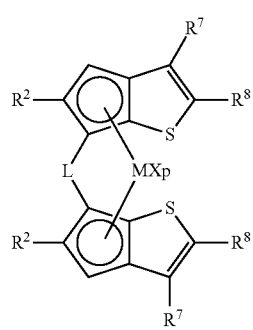

(Va)

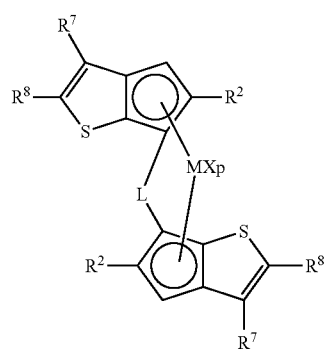

(Vb)

wherein M, X, p, L, $R^1$, $R^2$, $R^7$ and $R^8$ have the above described meaning Metallocene compounds of formula (Ia) and (Ib) are well known in the art, they can be prepared according to known procedure, such as those described in WO 01/44318, WO 03/045964, PCT/EP02/13552 and DE 10324541.3.

With said process it is possible to obtain the poly(1-butene) composition object of the present invention in an easy and economic way and in high yields. In fact the metallocene compounds having $C_2$ or C2-like symmetry such as the metallocene compound of formula (Ia) are usually obtained from the synthesis in a mixture of racemic and meso form, the meso form is usually inactive or it produces polymer having very low molecular weight. The applicant has surprisingly found that the meso form of the compound of formula (Ia) gives atactic high molecular weight poly(1-butene) in high yield. Therefore it is possible to use the racemic and meso mixture of the metallocene compound as such without the need of further purification in order to separate the two isomeric forms for achieving the composition object of the present invention. The amount of atactic copolymer in the composition of the present invention is directly proportional to the amount of meso form of the metallocene compound used in the catalyst system. At the same time the amount of the isotactic component of the composition is directly proportional to the amount of the racemic form of the metallocene compound. Thus roughly, since the activities of the two forms (rac and meso) are very similar the ratio of atactic/isotactic polymer can be foreseen by the rac/meso ratio used in the process according to the present invention.

Preferably in said process the metallocene compound of formula (Ia) and the metallocene compound of formula (Ib) have the same structure being different only for the spatial configuration (racemic or racemic-like and meso or meso-like). In this way the further advantage that it is possible to achieve is that the molecular weight distribution (Mw/Mn) of the 1-butene polymer composition obtained is lower than 3.5; preferably lower than 3; even more preferably lower than 2.5.

Alumoxanes used as component b) or c) in the above processes can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

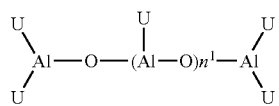

can be used in the case of linear compounds, wherein $n^1$ is 0 or an integer from 1 to 40 and the substituents U are defined as above; or alumoxanes of the formula:

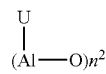

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl) aluminium, tris(2-ethyl-3-methyl-butyl)aluminium, tris(2-ethyl-3-methyl-pentyl)aluminium, tris(2,3-diethyl-pentyl) aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl) aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl]aluminium, tris[2-(3-isopropyl-phenyl)-propyl] aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Among the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formulas (Ia) and (Ib) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Organic aluminum compounds used as compound c) or d) are those of formula $H_jAlU_{3-j}$ or $H_jAl_2U_{6-j}$ as described above.

The polymerization process of the present invention can be carried out in liquid phase, optionally in the presence of an inert hydrocarbon solvent. Said hydrocarbon solvent can be either aromatic (such as toluene) or aliphatic (such as propane, hexane, heptane, isobutane, cyclohexane, isododecane and 2,2,4-trimethylpentane). Preferably, the polymerization process of the present invention is carried out by using liquid 1-butene and propylene mixture as polymerization medium.

The polymerization temperature preferably ranges from 0° C. to 250° C.; preferably comprised between 20° C. and 150° C. and, more particularly preferably between 40° C. and 90° C. Even more preferably between 60° C. and 80° C.

Preferably the polymerization process is carried out in solution, i.e. the polymer obtained is completely soluble in the polymerization medium.

The intrinsic viscosity (I.V.) was measured in tetrahydronaphtalene (THN) at 135° C. If indicated that it was measured in decahydronaphthalene, the conversion between the intrinsic viscosity measured in tetrahydronaphtalene and intrinsic viscosity measured in decahydronaphthalene (DHN) has been carried out according to the following empirical equation $$IV(THN)=0.87IV(DHN)$$

This equation has been derived by analyzing the IV measured in THN and DHN of several polybutene samples.

The melting points of the polymers ($T_m$) were measured by Differential Scanning calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature ($T_m$) and the area of the peak as melting enthalpy ($\Delta H_f$). In order to measure the amount of form I and Form II the area of the peaks of the melting points of the two forms obtained with the DSC has been measured.

Molecular weight parameters and molecular weight distribution for all the samples were measured using a Waters 150C ALC/GPC instrument (Waters, Milford, Mass., USA) equipped with four mixed-gel columns PLgel 20 µm Mixed-A LS (Polymer Laboratories, Church Stretton, United Kingdom). The dimensions of the columns were 300×7.8 mm. The solvent used was TCB and the flow rate was kept at 1.0 mL/min. Solution concentrations were 0.1 g/dL in 1,2,4 trichlorobenzene (TCB). 0.1 g/L of 2,6-di-t-butyl-4-methyl phenol (BHT) was added to prevent degradation and the injection volume was 300 µL. All the measurements were carried out at 135° C. GPC calibration is complex, as no well-characterized narrow molecular weight distribution standard reference materials are available for 1-butene polymers. Thus, a universal calibration curve was obtained using 12 polystyrene standard samples with molecular weights ranging from 580 to 13,200,000. It was assumed that the K values of the Mark-Houwink relationship were: $K_{PS}=1.21\times10^{-4}$, dL/g and $K_{PB}=1.78\times10^{-4}$ dL/g for polystyrene and poly-1-butene respectively. The Mark-Houwink exponents a were assumed to be 0.706 for polystyrene and 0.725 for poly-1-butene. Even though, in this approach, the molecular parameters obtained were only an estimate of the hydrodynamic volume of each chain, they allowed a relative comparison to be made.

$^{13}$C-NMR spectra were acquired on a DPX-400 spectrometer operating at 100.61 MHz in the Fourier transform mode at 120° C. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove $^1$H-$^{13}$C coupling. About 3000 transients were stored in 32K data points using a spectral window of 6000 Hz. The isotacticity of the copolymers is measured by $^{13}$C NMR, and is defined as the relative intensity of the mmmm triad peak of the diagnostic methylene of the ethyl branch. This peak at 27.73 ppm was used as internal reference. Pentad assignments are given according to *Macromolecules, 1992, 25, 6814-6817*.

The assignments of the butene/propylene copolymers and the evaluation of composition were made according to 1) H. N. Cheng, Journal of Polymer Science, Polymer Physics Edition, 21, 573 (1983)

The composition was calculated as follow using the $S\alpha\alpha$ carbons.

$$PP=S\alpha\alpha(47.15-46.52\ ppm)/\Sigma$$

$$BP=S\alpha\alpha(43.67-43.27\ ppm)/\Sigma$$

$$BB=S\alpha\alpha(40.23\ ppm)/\Sigma$$

Where $\Sigma=\Sigma S\alpha\alpha$

The total amount of 1 butene and propylene as molar percent is calculated from diads using the following relations:

$$[P]=PP+0.5BP$$

$$[B]=BB+0.5BP$$

Owing to the overlap between sequences due to stereoerrors and comonomer sequences in copolymers with C3 (m %) up to 50, the stereoregulairty of the B centred triads (PBP BBP and BBB) as mm content, was evaluated using the areas A and B where:
A: form 28.4 to 27.45 ppm represents the XBX mm triads
B: from 27.45 to 26.4 ppm represents the XBX mr+rr triads
(where X can be either B or P)
Therefore the content of isotactic fraction is obtained as follows:

$$XBXmm=100*A/(A+B).$$

The xylene solubles at 0° C. was measured according to the following procedure:

A sample of 2.5 of the reactor composition prepared above was suspended in 250 ml of xylene previously distilled. The mixture was heated so as to reach the temperature of 135° C. in about 30 minutes while gently stirring under a light nitrogen flow. Once the temperature of 135° C. has been reached, to complete the sample dissolution, the mixture has been kept at 135° for another 30 minutes.

Once the dissolution step has been concluded, the solution was air-cooled under stirring till it reaches a temperature of about 100° C. The flask containing the solution was then placed in a Dewar vessel with a water and ice bath, so that the temperature inside the flask falls to 0° C. The solution is kept at 0° C. under stirring for 1 hour, so as to complete the crystallisation[1] of the insoluble.

The obtained mixture was filtered through a short stem glass funnel and a quick filtering paper filter. If the filtrate is not completely limpid, the filtration is repeated. During the filtration step, the mixture is kept at 0° C. Once the filtration is finished, the filtrate has been balanced at 25° C., and then two 50-ml aliquots have been placed into two volumetric flasks.

One of the two 50-ml filtrate aliquots has been transferred into a previously calibrated aluminium pan (The aluminium pans are to be kept in a muffle furnace at 500° C. for 30 minutes before usage). The aluminium pan has been heated to 140° C. so to evaporate the solvent under a light nitrogen flow and, at the same time, collect and condense the evaporated solvent vapours. Once the solvent evaporation is completed, the pan has been placed in a vacuum (200-400 mbar) oven at 75-80° C. and under nitrogen flow so as to dry the content till constant weight (total soluble). This procedure has been repeated for the 50-ml second aliquot of filtrate.

In parallel an aliquot of 50 ml of xylene was subjected to the same evaporation procedure in order to have a blank reference.

The soluble fraction in o-xylene at 0° C. (total soluble) is expressed as a weight percentage with the following general formula:

$$XS\ \% = \frac{\left(\left(\frac{M_{r_1}+M_{r_2}}{2}\right)-\left(M_b \times \left(\frac{V_r}{V_b}\right)\right)\right) \times V_i}{M_i \times V_r} \times 100 \qquad (1)$$

where the symbols stand for the following:
XS %=weight percentage of the total soluble fraction;
$M_{r_1}$=first aliquot residue on evaporation;
$M_{r_2}$=second aliquot residue on evaporation;
$M_b$=blank residue on evaporation;
$M_i$=starting sample weight;
$V_r$=evaporated solution volume;
$V_b$=evaporated blank volume;
$V_i$=starting solvent volume.

The insoluble fraction in o-xylene at 0° C. (total soluble) is expressed as weight percentage with the following general formula:

$$XI\% = 100 - XS\% \qquad (2)$$

where the symbols stand for the following:
XI %=insoluble fraction weight percentage;
XS %=total soluble weight percentage.

FIG. 1 is a qualitative representation of the transformation from form II to form I vs time of copolymer of examples 1 and 2 and comparative example 1. As comparative example a 1.butene homopolymer having the same composition of the claimed copolymer has been used. From the plot clearly results that the transformation of the copolymers is quick. The analysis has been carried out by using DSC.

Figure 2:
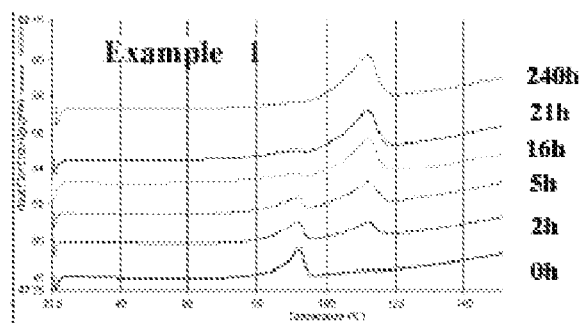

FIG. 2 shows the qualitative thermograms of the polymer of example 1 at various times.

The following examples are given for illustrative purpose and do not intend to limit the present invention.

EXAMPLES

The intrinsic viscosity (I.V.) was measured in tetrahydronaphtalene (THN) at 135° C.

The conversion between the intrinsic viscosity measured in tetrahydronaphtalene and intrinsic viscosity measured in decahydronaphthalene (DHN) has been carried out according to the following empirical equation

IV(THN)=0.87IV(DHN)

This equation has been derived by analyzing the IV measured in THN and DHN of several polybutene samples.

The melting points of the polymers ($T_m$) were measured by Differential Scanning calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature ($T_m$) and the area of the peak as melting enthalpy ($\Delta H_f$).

In order to measure the amount of form I and form II the area of the peaks of the melting points of the two forms has been measured.

Molecular weight parameters and molecular weight distribution for all the samples were measured using a Waters 150C ALC/GPC instrument (Waters, Milford, Mass., USA) equipped with four mixed-gel columns PLgel 20 μm Mixed-A LS (Polymer Laboratories, Church Stretton, United Kingdom). The dimensions of the columns were 300×7.8 mm. The solvent used was TCB and the flow rate was kept at 1.0 mL/min. Solution concentrations were 0.1 g/dL in 1,2,4 trichlorobenzene (TCB). 0.1 g/L of 2,6-di-t-butyl-4-methyl phenol (BHT) was added to prevent degradation and the injection volume was 300 μL. All the measurements were carried out at 135° C. GPC calibration is complex, as no well-characterized narrow molecular weight distribution standard reference materials are available for 1-butene polymers. Thus, a universal calibration curve was obtained using 12 polystyrene standard samples with molecular weights ranging from 580 to 13,200,000. It was assumed that the K values of the Mark-Houwink relationship were: $K_{PS}=1.21 \times 10^{-4}$, dL/g and $K_{PB}=1.78 \times 10^{-4}$ dL/g for polystyrene and poly-1-butene respectively. The Mark-Houwink exponents α were assumed to be 0.706 for polystyrene and 0.725 for poly-1-butene. Even though, in this approach, the molecular parameters obtained were only an estimate of the hydrodynamic volume of each chain, they allowed a relative comparison to be made.

$^{13}$C-NMR spectra were acquired on a DPX-400 spectrometer operating at 100.61 MHz in the Fourier transform mode at 120° C. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove $^1$H-$^{13}$C coupling. About 3000 transients were stored in 32K data points using a spectral window of 6000 Hz. The isotacticity of the copolymers is measured by $^{13}$C NMR, and is defined as the relative intensity of the mmmm triad peak of the diagnostic methylene of the ethyl branch. This peak at 27.73 ppm was used as internal reference. Pentad assignments are given according to *Macromolecules*, 1992, 25, 6814-6817. The assignments of the butene/propylene copolymers and the evaluation of composition were made according to 1) H. N. Cheng, Journal of Polymer Science, Polymer Physics Edition, 21, 573 (1983)

The composition was calculated as follow using the Sαα carbons.

$PP=S\alpha\alpha(47.15-46.52\ ppm)/\Sigma$ $BP=S\alpha\alpha(43.67-43.27\ ppm)/\Sigma$ $BB=S\alpha\alpha(40.23\ ppm)/\Sigma$ Where $\Sigma=\Sigma S\alpha\alpha$ The total amount of 1 butene and propylene as molar percent is calculated from diads using the following relations:

$[P]=PP+0.5BP$ $[B]=BB+0.5BP$

Owing to the overlap between sequences due to stereoerrors and comonomer sequences (FIG. 1), in copolymers with C3 (m %) up to 50, the stereoregulairty of the B centred triads (PBP BBP and BBB) as mm content, was evaluated using the areas A and B where:
A: form 28.4 to 27.45 ppm represents the XBX mm triads
B: from 27.45 to 26.4 ppm represents the XBX mr+rr triads
(where X can be either B or P)

Therefore the content of isotactic fraction is obtained as follows:

$XBXmm=100*A/(A+B)$.

Infrared Crystallinity

Infrared crystallinity was determined from the infrared absorption spectrum of about 1 mm thin film of the polymer by using the absorptions A at 1221 cm$^{-1}$ and 1151 cm$^{-1}$ in the equation:

$$\text{crystallinity} = \frac{\left(\frac{A_{1221}}{A_{1151}}\right)_{solid} - 0.76}{5.43 - 0.76}$$

The equation is described in Chem. of High Polymers (Japan) 19, 667 (1962) by Nishioka and Yanagisawa.

Xylene Solubles at 0° C.

A sample of 2.5 of the reactor composition prepared above was suspended in 250 ml of xylene previously distilled. The mixture was heated so as to reach the temperature of 135° C. in about 30 minutes while gently stirring under a light nitrogen flow. Once the temperature of 135° C. has been reached, to complete the sample dissolution, the mixture has been kept at 135° for another 30 minutes.

Once the dissolution step has been concluded, the solution was air-cooled under stirring till it reaches a temperature of about 100° C. The flask containing the solution was then placed in a Dewar vessel with a water and ice bath, so that the temperature inside the flask falls to 0° C. The solution is kept at 0° C. under stirring for 1 hour, so as to complete the crystallisation[2] of the insoluble.

The obtained mixture was filtered through a short stem glass funnel and a quick filtering paper filter. If the filtrate is not completely limpid, the filtration is repeated. During the filtration step, the mixture is kept at 0° C. Once the filtration is finished, the filtrate has been balanced at 25° C., and then two 50-ml aliquots have been placed into two volumetric flasks.

One of the two 50-ml filtrate aliquots has been transferred into a previously calibrated aluminium pan (The aluminium pans are to be kept in a muffle furnace at 500° C. for 30 minutes before usage). The aluminium pan has been heated to 140° C. so to evaporate the solvent under a light nitrogen flow and, at the same time, collect and condense the evaporated solvent vapours. Once the solvent evaporation is completed, the pan has been placed in a vacuum (200-400 mbar) oven at 75-80° C. and under nitrogen flow so as to dry the content till constant weight (total soluble). This procedure has been repeated for the 50-ml second aliquot of filtrate.

In parallel an aliquot of 50 ml of xylene was subjected to the same evaporation procedure in order to have a blank reference.

The soluble fraction in o-xylene at 0° C. (total soluble) is expressed as a weight percentage with the following general formula:

$$XS\% = \frac{\left(\left(\frac{M_{r1} + M_{r2}}{2}\right) - \left(M_b \times \left(\frac{V_r}{V_b}\right)\right)\right) \times V_i}{M_i \times V_r} \times 100 \quad (1)$$

where the symbols stand for the following:
XS %=weight percentage of the total soluble fraction;
$M_{r1}$=first aliquot residue on evaporation;
$M_{r2}$=second aliquot residue on evaporation;
$M_b$=blank residue on evaporation;
$M_i$=starting sample weight;
$V_r$=evaporated solution volume;
$V_b$=evaporated blank volume;
$V_i$=starting solvent volume.

The insoluble fraction in o-xylene at 0° C. (total soluble) is expressed as weight percentage with the following general formula:

$$XI\% = 100 - XS\% \quad (2)$$

where the symbols stand for the following:
XI %=insoluble fraction weight percentage;
XS %=total soluble weight percentage.

Preparation of Components a) General Procedure meso dimethylsilandiylbis-6-[2,5-dimethyl-3-(2'-methylphenyl)cyclopentadienyl-[1,2-b]-thiophene]zirconium dichloride (A-1) was prepared according to WO 01/44318. Rac dimethylsilandiylbis-6-[2,5-dimethyl-3-(2'-methyl-phenyl)cyclopentadienyl-[1,2-b]-thiophene]zirconium dichloride (A-2) was prepared according to WO01/44318.

Catalyst System

A 101 g/L solution of TIBA in isododecane was mixed a 30% wt/wt toluene solution of Methylalumoxane (MAO) in order to reach MAO/TIBA, molar ratio 2:1. This solution was then added to a mixture of A-1 and A-2 (60/40). The resulting catalytic solution contains 3.21% wt of A-1+A-2 and 24.7% wt of Al.

1-butene Polymerization

The polymerization was carried out in a pilot plant comprising two stirred reactors connected in series in which liquid butene-1 and propylene constituted the liquid medium. The catalyst system reported in table 1 was injected into the reactor at a feed rate of 8-10 g/h and the polymerization was carried out in continuous at a polymerization temperature of 65° C., while 1-butene and propylene were feed according to the data reported on table 1. The pressure of the two reactors was kept constant at 24 bar-g. Two runs have been carried out. The 1-butene polymer was recovered as melt from the solution and cut in pellets. The polymerization conditions are reported in table 1

TABLE 1

| | Run | | | |
|---|---|---|---|---|
| | 1 | | 2 | |
| | 1-1 First reactor | 1-2 Second reactor | 2-1 First reactor | 2-2 Second reactor |
| Residence time (min) | 125 | 77 | 177 | 110 |
| C4-feed (kg/h) | 100 | 55 | 100 | 55 |
| C3-feed (kg/h) | 9.5 | 3.5 | 16.6 | 6.8 |
| Yield kg/g[§] | 4.4 | | 4.8 | |

[§]yield referred to Kg polymer/g catalyst system
C4 = 1-butene
C3 = propylene

Sample of copolymer coming from the first or the second run were collected analyzed after about 10 days of annealing according to ISO 527-1 and ISO 178. The data are reported in table 2

TABLE 2

| | | Run | |
|---|---|---|---|
| | | 1 | 2 |
| | | From run | |
| | | 1 | 2 |
| MEF (ISO) aged 10 min in autoclave | MPa | 25 | 22 |

TABLE 2-continued

| | | Run | |
|---|---|---|---|
| | | 1 | 2 |
| | | | From run |
| | | 1 | 2 |
| STRESS AT BREAK | | | |
| spec. type S2 aged 10 min in autoclave | MPa | 13.2 | 13.7 |
| ELONGATION AT BREAK | | | |
| spec. type S2 aged 10 min in autoclave | % | 520 | 590 |
| COMPRESSION SET 25%, 22 h | | | |
| at 70° C. aged 240 h | % | 50 | 50 |
| at 70° C. aged 10 min in autoclave | % | 52 | 42 |
| SHORE A aged 10 min in autoclave | — | 86 | 84.5 |
| Propylene content NMR | Wt % | 5.2 | 9.8 |
| Mw/Mn | | 2.2 | 2.3 |
| Xylene solubility at 0° | % | >99 | >99 |
| Mmmm pentads | % | 57 | 61 |
| Melting point (Tm(II) form II) | ° C. | 92 | 87 |

Compression moulded plaques of the polymers of examples 1-2 have been obtained. The DSC analysis on samples of these plaques have been carried out at various time in order to detect the percentage of form I formed. The results are reported in table 5 compared with the results of the same analysis carried out on samples of the composition 6 described in EP04103525.4. They have been plotted in FIG. 1.

TABLE 4

| Samples | Time (h) | % form I | C3 (% wt.) |
|---|---|---|---|
| Ex 1 | 0 | 2.4 | 5.2 |
| | 2 | 34.9 | |
| | 5 | 54.4 | |
| | 16 | 83.9 | |
| | 21 | 87.2 | |
| | 240 | 100 | |
| Ex 2 | 0.17 | 46.7 | 9.8 |
| | 0.5 | 84.2 | |
| | 5 | 100 | |
| | 21 | 100 | |
| | 46 | 100 | |
| Comp Ex 1 | 0 | 0 | 0 |
| | 22 | 8.7 | |
| | 74 | 31.4 | |
| | 168 | 50.1 | |
| | 360 | 65.4 | |

The invention claimed is:

1. A 1-butene/propylene crystalline copolymer composition having a content of propylene derived units from 4 to 10% by weight, wherein at least 50% of the crystalline polymer is present in the thermodynamically stable, trigonal Form I after 5 hours of the first melting at room temperature; said composition having
   i) isotactic pentads (mmmm) measured by $^{13}$C-NMR, between 30% and 80%;
   ii) a melting point (Tm(II)) higher than 70° C.;
   iii) a distribution of molecular weight Mw/Mn equal to or lower than 4; and
   iv) a solubility in xylene at 0° C. higher than 75%;

said composition obtained by polymerizing 1-butene and propylene in the presence of a catalyst system obtained by contacting:
   a) at least a metallocene compound of formula (Ia) in the meso or meso-like form:

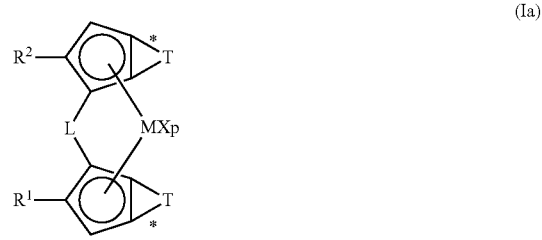

wherein

M is an atom of a transition metal selected from those belonging to group 3, 4, 5, 6 or to the lanthanide or actinide groups in the Periodic Table of the Elements;

p is an integer from 0 to 3, being equal to the formal oxidation state of the metal M minus 2;

X, same or different, is a hydrogen atom, a halogen atom, or an R, OR, $OSO_2CF_3$, OCOR, SR, $NR_2$ or $PR_2$ group, wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals;

L is a divalent $C_1$-$C_{40}$ hydrocarbon radical optionally containing heteroatoms belonging to groups 13-17 of the Periodic Table of the Elements or a divalent silylene radical containing up to 5 silicon atom;

$R^1$ and $R^2$, equal to or different from each other, are $C_1$-$C_{40}$ hydrocarbon radicals optionally containing heteroatoms belonging to groups 13-17 of the Periodic Table of the Elements;

T, equal to or different from each other, is a moiety of formula (IIa), (IIb) or (IIc):

-continued

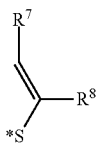
(IIc)

wherein the atom marked with the symbol * bonds the atom marked with the same symbol in the compound of formula (Ia); and wherein at least one T group has formula (IIb) or (IIc);

$R^3$ is a $C_1$-$C_{40}$ hydrocarbon radical optionally containing heteroatoms belonging to groups 13-17 of the Periodic Table of the Elements;

$R^4$ and $R^6$, equal to or different from each other, are hydrogen atoms or $C_1$-$C_{40}$ hydrocarbon radicals optionally containing heteroatoms belonging to groups 13-17 of the Periodic Table of the Elements;

$R^5$ is a $C_1$-$C_{40}$ hydrocarbon radical optionally containing heteroatoms belonging to groups 13-17 of the Periodic Table of the Elements;

$R^7$ and $R^8$, equal to or different from each other, are hydrogen atoms or $C_1$-$C_{40}$ hydrocarbon radicals optionally containing heteroatoms belonging to groups 13-17 of the Periodic Table of the Elements;

b) at least a metallocene compound of formula (Ib) in the racemic (rac) or racemic-like form

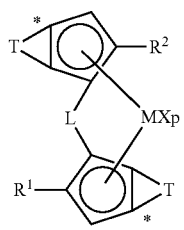
(Ib)

wherein the atoms marked with the symbol * bonds the atom marked with the same symbol in the moieties of formula (IIa), (IIb) or (IIc); and c) an alumoxane or a compound capable of forming an alkyl metallocene cation, wherein the ratio between the racemic or the racemic like form and the meso form or the meso-like form ranges from 20:80 to 80:20.

2. The 1-butene/propylene copolymer composition according to claim 1 wherein the isotactic pentads (mmmm) are between 45% and 75%.

3. The 1-butene/propylene copolymer composition according to claim 1 wherein at least 80% of the crystalline polymer is present in the thermodynamically stable, trigonal Form I after 16 hours at room temperature.

4. The 1-butene/propylene copolymer composition according to claim 1 wherein the intrinsic viscosity (IV) measured in tetrahydronaphtalene (THN) at 135° C. is comprises between 0.5 dl/g and 4.0 dl/g.

5. The 1-butene/propylene copolymer composition according to claim 1 wherein solubility in xylene at 0° C. is higher than 90.0%.

6. The 1-butene/propylene copolymer composition according to claim 1 wherein the molecular weight distribution (Mw/Mn) is lower than 3.

7. The 1-butene/propylene copolymer composition according to claim 1 wherein the Shore A ranges from 50 to 100.

8. The 1-butene/propylene copolymer composition according to claim 1 being obtained with a polymerization process carried out in solution.

9. The 1-butene/propylene copolymer composition according to claim 1 wherein the ratio between the racemic or the racemic like form and the meso form or the meso-like form of the compounds of formula (Ia) and (Ib) ranges from 30:70 to 70:30.

10. The 1-butene/propylene copolymer composition according to claim 9 wherein the compounds of formulas (Ia) and (Ib) have respectively the following formulas (Va) or (Vb)

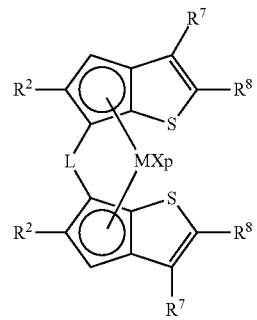
(Va)

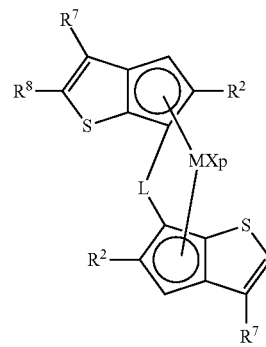
(Vb)

* * * * *